April 27, 1965    J. J. KAWECKA    3,180,720
APPARATUS FOR FORMING GLASS ARTICLES
Filed Dec. 14, 1960    7 Sheets-Sheet 1
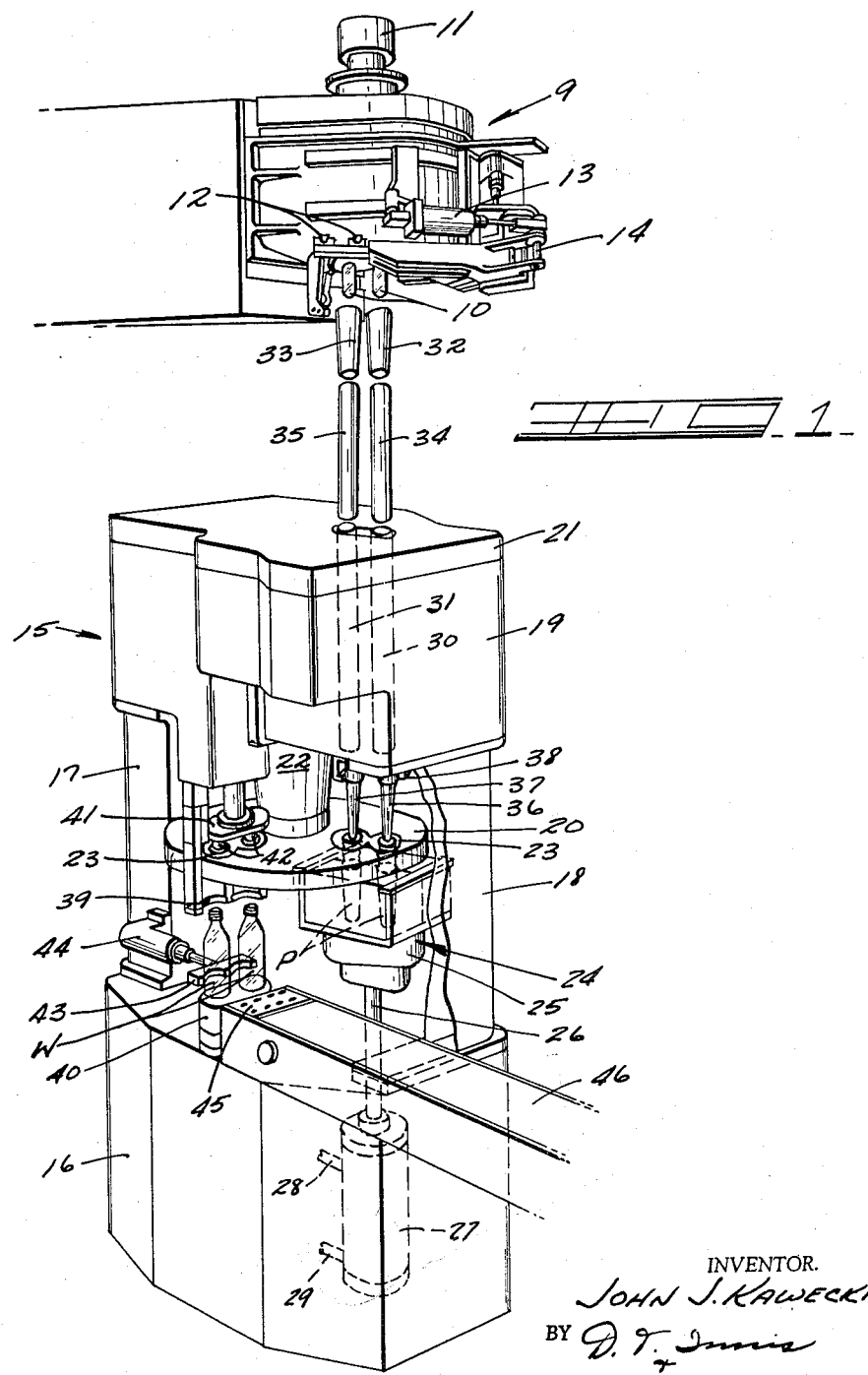
INVENTOR.
JOHN J. KAWECKA
BY
ATTORNEYS April 27, 1965      J. J. KAWECKA      3,180,720
APPARATUS FOR FORMING GLASS ARTICLES
Filed Dec. 14, 1960      7 Sheets-Sheet 2
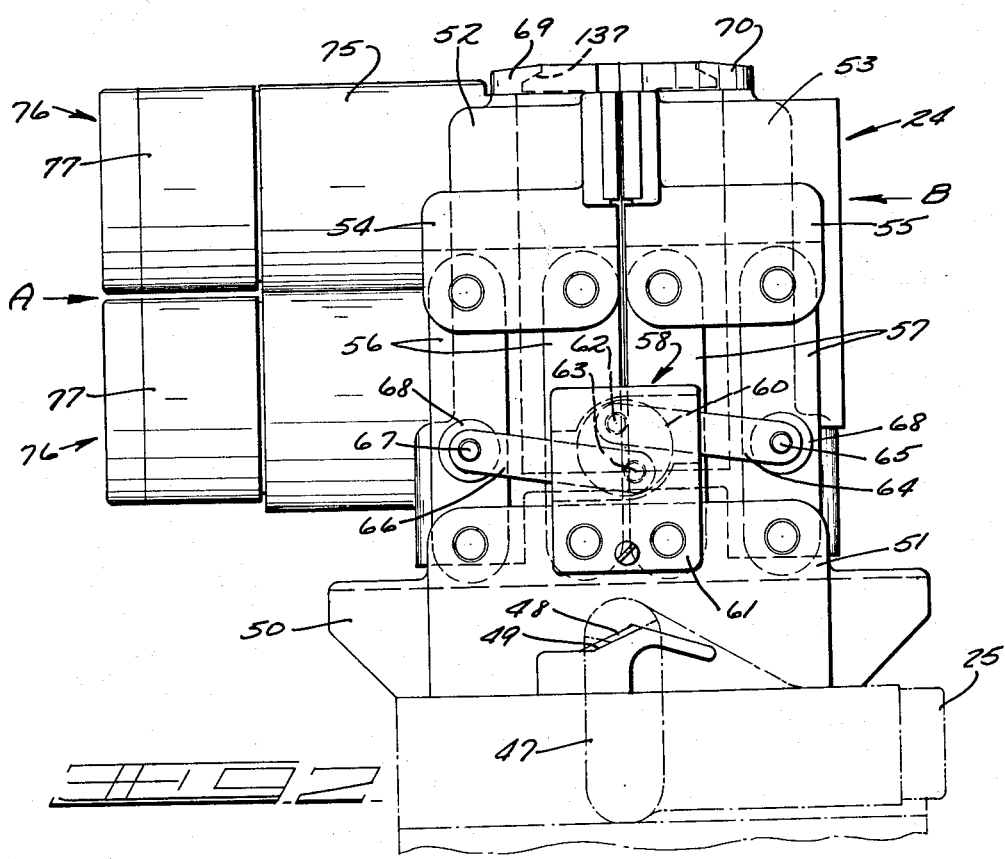
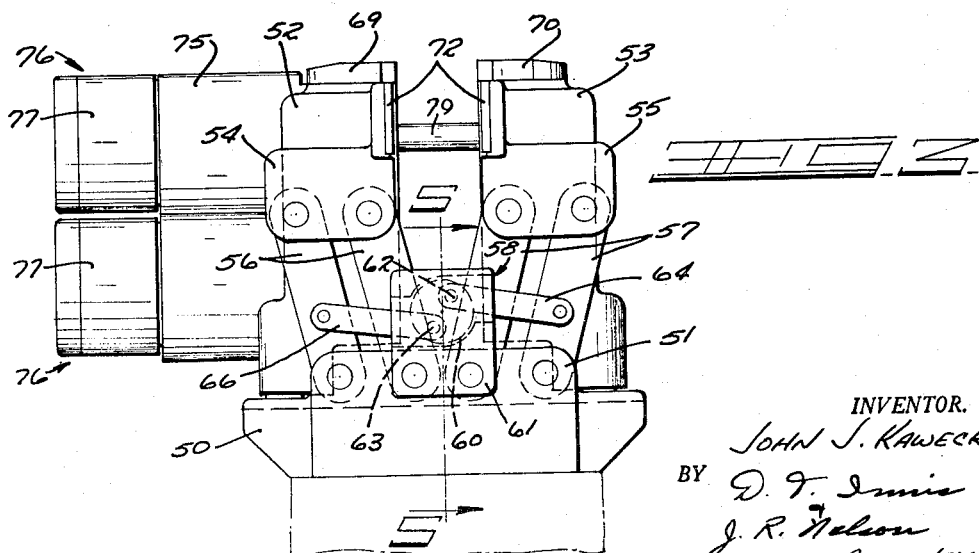
INVENTOR.
JOHN J. KAWECKA
BY
ATTORNEYS April 27, 1965  J. J. KAWECKA  3,180,720
APPARATUS FOR FORMING GLASS ARTICLES
Filed Dec. 14, 1960  7 Sheets-Sheet 3
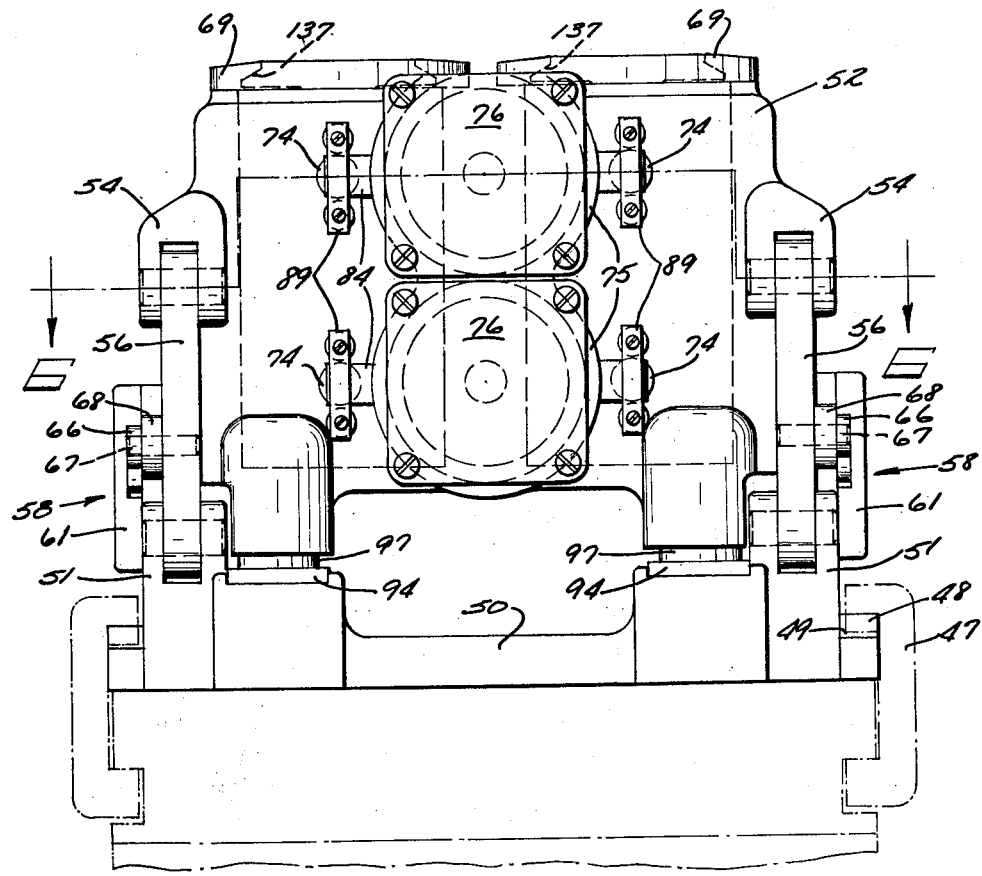
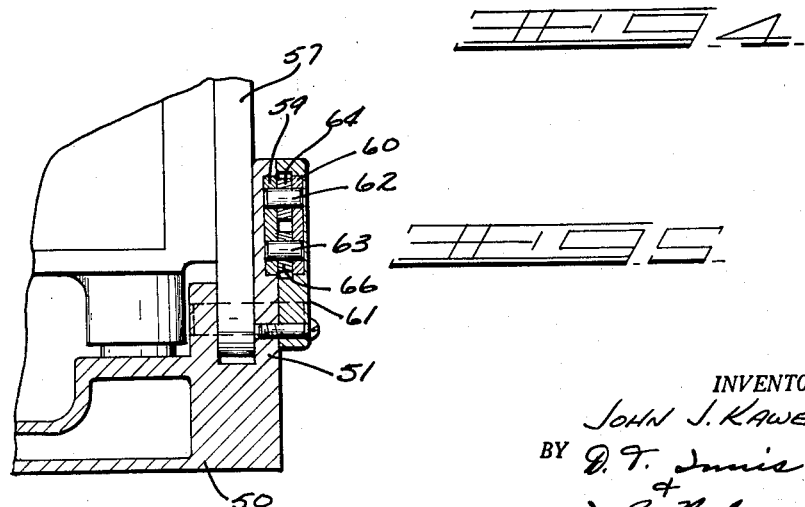
INVENTOR.
JOHN J. KAWECKA
BY
ATTORNEYS April 27, 1965   J. J. KAWECKA   3,180,720
APPARATUS FOR FORMING GLASS ARTICLES
Filed Dec. 14, 1960   7 Sheets-Sheet 4
FIG. 5B
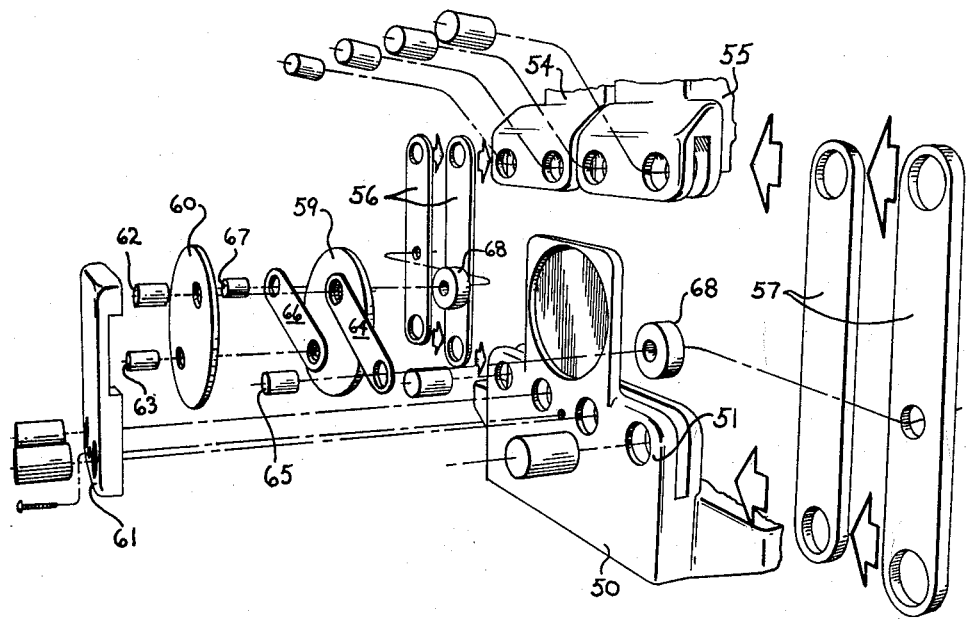
FIG. 5A
FIG. 5C
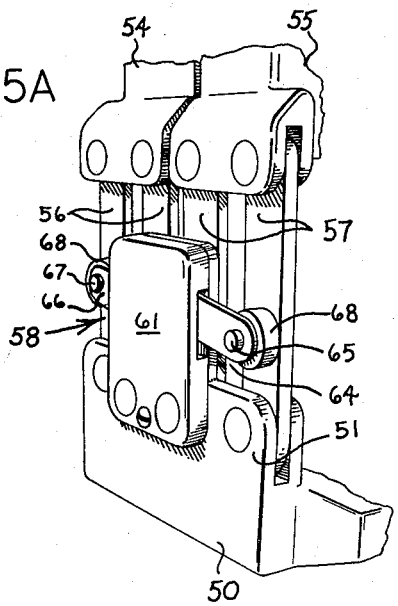
INVENTOR.
JOHN J. KAWECKA
BY
ATTORNEYS

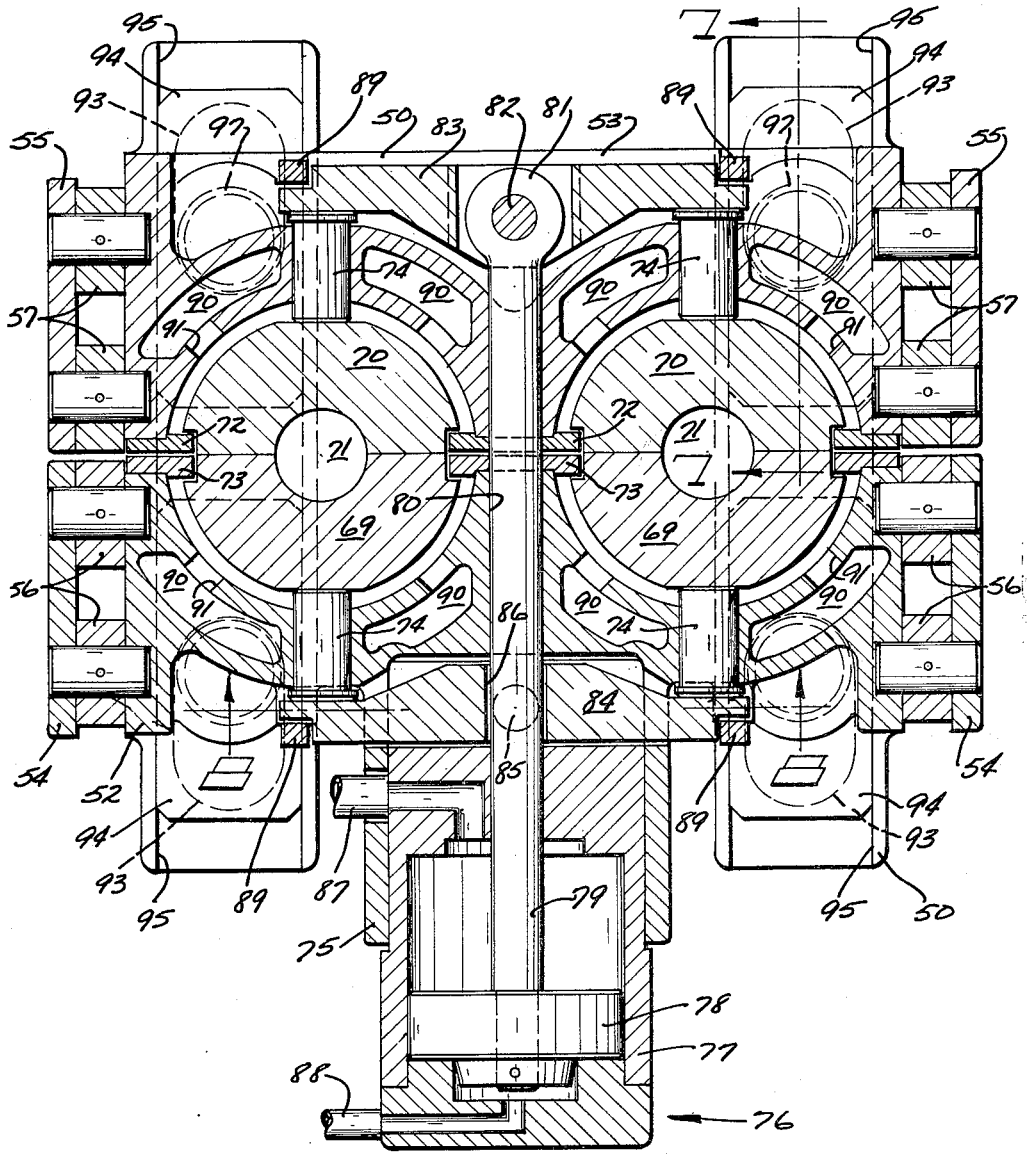

April 27, 1965 J. J. KAWECKA 3,180,720
APPARATUS FOR FORMING GLASS ARTICLES
Filed Dec. 14, 1960 7 Sheets-Sheet 6
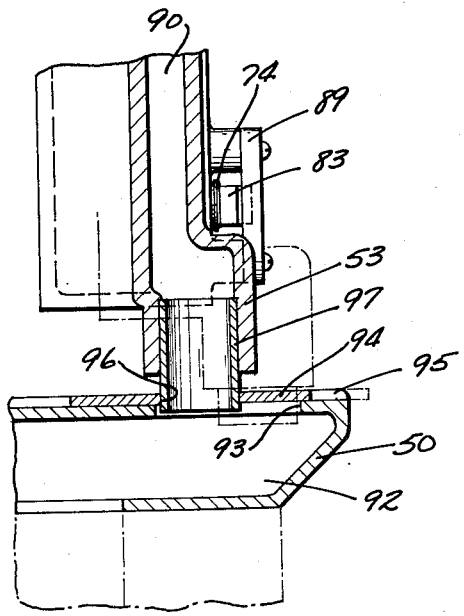
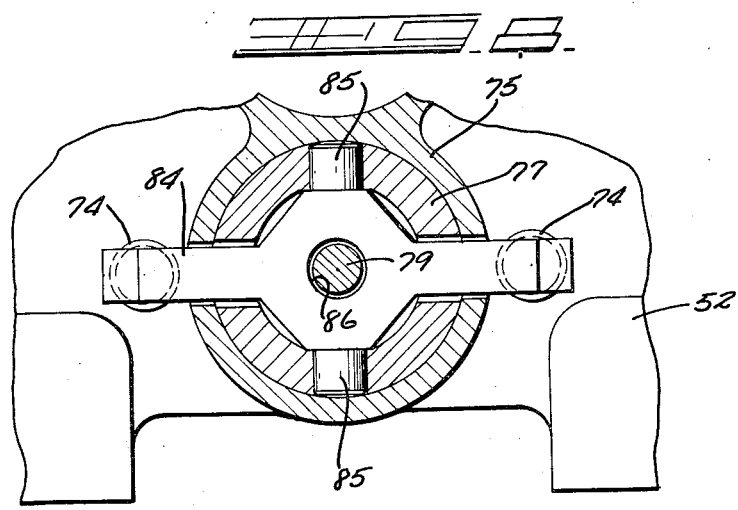
INVENTOR.
JOHN J. KAWECKA
BY
ATTORNEYS April 27, 1965 J. J. KAWECKA 3,180,720
APPARATUS FOR FORMING GLASS ARTICLES
Filed Dec. 14, 1960 7 Sheets-Sheet 7
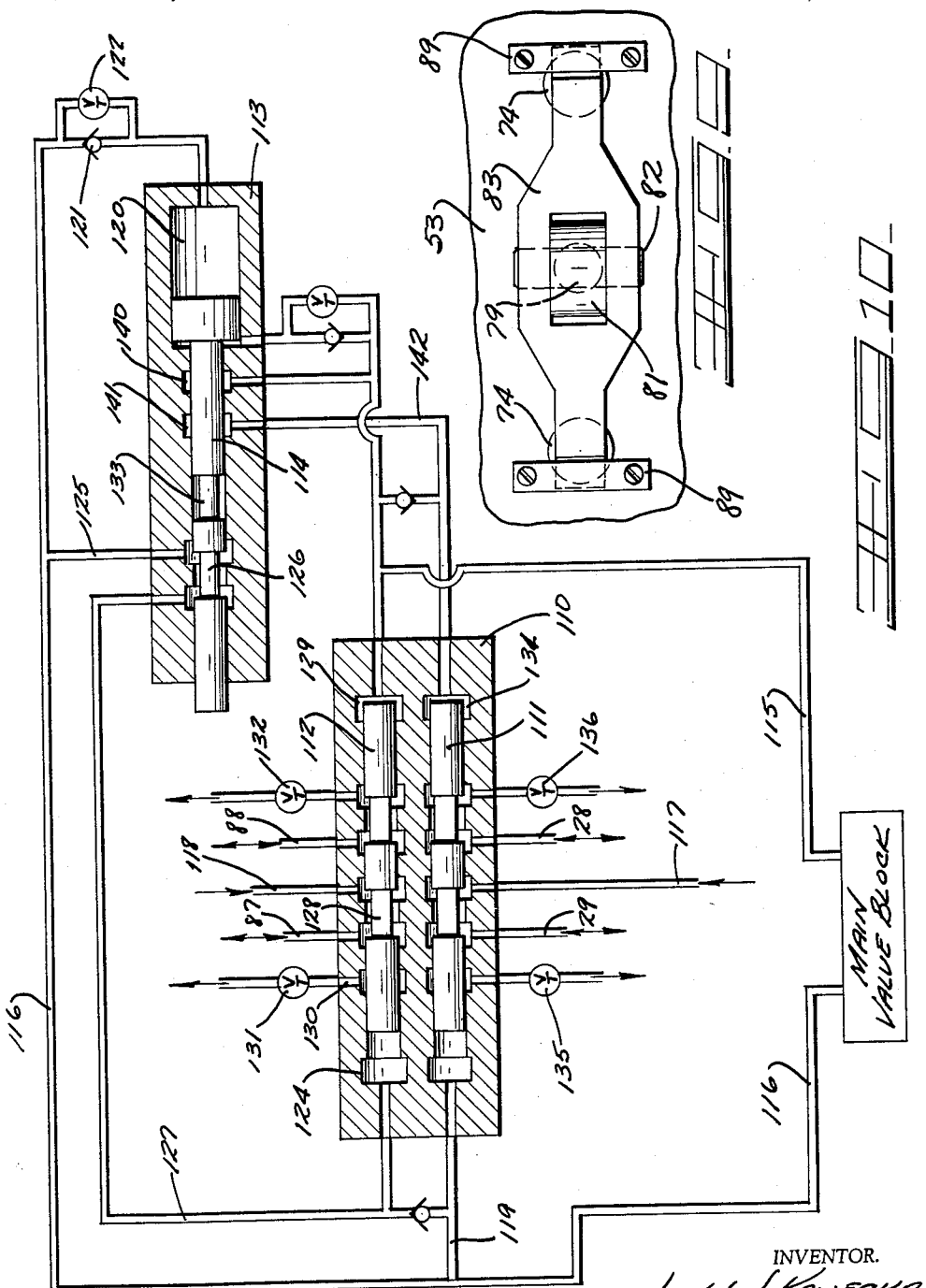
INVENTOR.
JOHN J. KAWECKA
BY
ATTORNEYS

United States Patent Office 3,180,720
Patented Apr. 27, 1965

3,180,720
APPARATUS FOR FORMING GLASS ARTICLES
John J. Kawecka, Toledo, Ohio, assignor to Owens-Illinois Glass Company, a corporation of Ohio
Filed Dec. 14, 1960, Ser. No. 75,712
10 Claims. (Cl. 65—359)

This invention relates to glass ware forming mechanism and in particular to a parison or blank forming mold mechanism for shaping parisons or ware of the narrow neck type. Such shaping may be either for forming parisons which are ultimately blown to final form or the forming of generally narrow shaped glass articles.

In present day machines of the gob fed type, it is the usual procedure to charge the mold by delivering the gob to the mold at the station preceding the pressing thereof or by charging the mold at the pressing station. In the forming of narrow neck ware it has been the practice to charge the parison mold while in inverted position through the open bottom of the mold disposed uppermost at the time of charging. The narrow neck of the article will be formed at the lowermost portion of the inverted mold in partible neck rings or a neck mold in register with the blank mold. In those cases where the parison is formed by the operation of a plunger, it is necessary that a baffle plate be closed over the open bottom of the mold and the plunger moved vertically from below through the neck mold and into the blank mold. After the parison has been pressed, it has been necessary to invert the parison before completing the shaping of the article, which shaping is usually done by enclosing the parison in a finish mold and introducing air under pressure to the hollow interior of the parison through the opening in the formed neck finish of the article. Because of the fact that it is necessary to use a baffle plate to close the bottom of the parison mold before pressing the parison, the final article will have what are termed "baffle marks."

In the present invention the charge or gob of molten glass is delivered to the parison mold through the neck mold about a portion of the neck mold. The parison mold is formed of two open-faced halves so that the two halves may be opened and closed and the parison may be formed in an upright position. When forming narrow neck parisons in an upright position, a relatively large body of molten glass will be contained in the bottom portion of the parison mold. The parison mold cavity for narrow neck ware is of varying diameter throughout its length with at least one of its diameters being greater than the diameter of the neck mold cavity. This relationship of mold diameters correlated to the ware formed from the mold, defines the type of ware herein referred to as "narrow neck ware." Consequently, it is necessary to use a split parison mold in order to separate the parison from the blank or parison mold after the pressing of the parison has been completed. Obviously, the parison cannot be stripped from the parison mold unless the mold is open. Furthermore, by providing a two-piece parison mold, which is split along its vertical height, it is unnecessary to use a baffle, hence, there is no possibility of having "baffle marks" appear in the finished ware.

In the present invention the split parison mold is mounted for vertical movement into engagement with the neck mold and closed thereon. The neck mold is carried by a horizontally rotatable turret wherein a series of neck molds are adapted to be moved successively into substantially vertical alignment with the parison mold. The gob or mold charge is delivered to the closed parison mold from above through the neck mold. The mechanism moves the plunger, which is positioned above the turret, laterally into vertical alignment with the neck mold and then downwardly into the parison mold cavity.

After the pressing is completed, the plunger is retracted, the parison mold opened, and the mold retracted. When there is sufficient clearance between the end of the plunger and the neck mold, and the open blank mold halves have been lowered below the end of the formed parison, the turret is indexed to laterally transfer the parison to the blowing station. After the parison has been blown to final form, the turret is again indexed to carry the completed ware to the takeout station. By providing three sets of neck molds spaced 120° apart on the turret, it is possible to have full overlap of operation, that is, while the parison is being pressed, a previously pressed parison is being blown to final form and a previously blown article is being discharged at the takeout station.

It is an object of this invention to provide a two-piece molding apparatus having positive opening and closing motion.

It is an additional object of this invention to provide an apparatus for forming two narrow neck parisons simultaneously.

It is an additional object of this invention to provide an apparatus for forming narrow neck parisons wherein plural parison mold valves are held closed with equal forces.

It is a still further object of this invention to provide a double cavity split parison mold in which the mechanism for holding the mold closed is a self-contained unit capable of limited horizontal movement.

Other and further objects will be apparent from the following descriptive material taken in combination with the attached drawings wherein:

FIG. 1 is a schematic perspective view of a glass forming unit incorporating the invention.

FIG. 2 is a schematic side elevational of the parison mold cage of the invention.

FIG. 3 is a schematic elevational view similar to FIG. 2 on a slightly reduced scale showing the mold halves open.

FIG. 4 is a schematic elevational view looking in the direction of arrow "A" on FIG. 2.

FIG. 5 is a partial sectional view taken at line 5—5 on FIG. 3.

FIG. 5A is a perspective view illustrating the mold halves opening and closing equalizer linkage at one side thereof.

FIG. 5B is an exploded view of the linkage of FIG. 5A.

FIG. 5C is perspective view of the disk retaining housing of FIG. 5A turned 90° about a vertical axis.

FIG. 6 is a sectional view taken at line 6—6 on FIG. 4.

FIG. 7 is a partial sectional view taken at line 7—7 on FIG. 6.

FIG. 8 is a partial sectional view taken at line 8—8 on FIG. 6.

FIG. 9 is a partial elevational view looking in the direction of arrow "B" on FIG. 2.

FIG. 10 is a diagrammatic view of the hydraulic circuit for operating the parison mold.

The accompanying drawings illustrate the present invention as a mechanism for use in a plural cavity mold, double gob operation in the forming of glass articles. However, this invention is not to be limited to use in double gob operation as several of its features may also be applied to single mold and single gob operation. In addition, this invention is also applicable to the pressing of finished glass articles in either single or double cavity pressing operation.

As illustrated in FIG. 1, there is a well-known glass feeder 9 of the double gob type. This feeder is arranged to simultaneously deliver a pair of gobs or molten charges 10 of plastic and workable glass to substantially parallel gob guide structures. The feeder 9 has a reciprocable plunger 11 and the usual double blade cutting shears 12 actuated by the hydraulic cylinder 13 through suitable linkage 14. A forming machine, generally designated 15, is positioned beneath the feeder 9. The forming machine 15 is comprised of a base 16 with vertical members 17 and 18 connected to the top of the base 16. The members 17 and 18 support an upper housing structure 19 which contains the drive mechanism for indexing a rotatable turret 20. The upper structure 19 has an underlying cover member 21 to prevent the intrusion of foreign material into the drive mechanism. Extending downwardly from the housing 19 is a bearing bracket 22 arranged to support a vertical shaft upon which is mounted the turret 20. The turret 20 carries or supports a plurality of sets of neck molds 23 with each set being equally spaced circumferentially about the turret 20. Thus it can be seen that the turret 20 is arranged to transport the neck molds 23 from station to station in succession. The parison mold holders 24 also referred to as a mold cage are located at the parison forming station and are arranged for vertical reciprocation to bring the parison molds into and out of contact with the neck molds 23 carried on the turret 20.

The parison mold cage 24 is split along a radial line of the turret and each half carries a pair of parison mold halves. The parison mold cage is carried by a crosshead 25 which in turn is attached to the upper end of a vertically disposed piston rod 26. The piston rod 26 is arranged for reciprocation by a vertically disposed fluid motor 27 whose operation is controlled by the introduction of fluid under pressure through a pair of conduits 28 and 29. Introduction of fluid under pressure through conduit 29, while conduit 28 is connected to exhaust, will raise the mold cage 24; whereas introduction of fluid under pressure through conduit 28, accompanied by the exhaust of fluid through conduit 29, will lower the mold cage 24.

In order to provide efficient charging of the blank molds, a pair of fixed gob guides 30 and 31 extend vertically through the upper housing structure 19. These gob guides are permanently located in alignment with the neck molds 23 positioned at the pressing station. As charges 10 are formed and severed from the feeder 9, they will be guided by a pair of funnels 32 and 33 and deflectors 34 and 35 into the open upper ends of the guides 30 and 31.

A pair of glass pressing plungers 36 and 37 are mounted in a guideway 38 which is attached to the under-surface of the upper housing structure 19. These plungers 36 and 37 are adapted to be moved horizontally into and out of alignment with the neck molds 23. After the charges 10 are delivered to the mold cage 24, the plungers 36 and 37 are moved from a remote position out of alignment with the neck rings into a position vertically above the neck rings and then are moved in a downward or pressing direction to press the charges within the mold cage 24.

The details of the mechanism for shifting the plungers 36 and 37 do not form any part of this invention and are specifically described in copending application Ser. No. 845,238, filed on October 8, 1959, now abandoned and continued in application Serial No. 60,416, filed on October 4, 1960, owned by the assignee of this application and reference may be had thereto for full details of this mechanism.

As stated before, after the pressing has been completed the plungers 36 and 37 are retracted upwardly until their lower ends clear the neck rings 23 and simultaneously the parison mold cage 24 is opened and lowered so that its upper surface will be below the lower end of the formed parisons "P" which depend from the neck rings 23. The turret is then indexed 120° carrying the formed parisons to the next station where the blow mold 39 (one-half of which is shown in open position in FIG. 1) is closed about the parison and the parisons are blown to final form. The blow mold is then opened and the turret is again indexed 120° bringing the formed articles to the takeout station. At the takeout station a vertically movable transfer and cooling head 40 is elevated until in contact with the bottom surfaces of the formed articles at which time the neck rings 23 at this station are opened to release articles "W" to the transfer head 40. At the same time that the transfer head 40 is being raised into approximate contact with the bottom surfaces of the formed articles "W," the finish cooling head 41, having cooling nozzles 42 depending therefrom, is moved downwardly so as to extend the nozzles 42 into the neck area of the formed articles "W." With the nozzles so positioned, cooling air is supplied thereto to insure that the articles are sufficiently set up so that they may be handled without being deformed. The transfer head 40 is retracted and the cooling head 41 is moved vertically upward and the formed articles which have been released from the neck rings 23 will be lowered so that a suitable horizontal transfer means 43 actuated by a hydraulic cylinder 44 will move the articles from the transfer head 40 to a wind box 45 and then to a continuously moving horizontal belt conveyor 46. The conveyor 46 carries the formed articles "W" away from the forming machine to the next operation which usually is an annealing lehr where the article is heat treated under controlled temperature conditions.

With reference to FIGS. 2 to 9, the detailed disclosure of the parison mold cage and its details of operation will be presented.

As best shown in FIGS. 2 and 4, the parison mold holder 24 is clamped to the movable crosshead 25 by means of a clamping device 47 having clamping faces 48 at opposite ends thereof which are adapted to engage beveled surfaces 49 formed on a mold cage support base 50. The crosshead 25 is adapted to convey air, from below, into contact with the bottom surface of the base 50. The base 50 has an elongated bifurcated portion 51 which extend above the base along the sides thereof. As previously stated, the parison mold cage 24 is a split mold cage and is formed of a first mold cage half 52 and a second mold cage half 53 which are adapted to be moved toward and away from each other. Both parison mold cage halves 52 and 53 carry bifurcated portions 54 and 55 which open therein downward in the direction of the opening of the bifurcated portion 51 of the base 50. Vertically extending pairs of connecting links 56 and 57 are adapted to be pivotally supported at one end in the portion 51 of the base 50 and to be pivotally supported at their other ends in the portions 54 and 55 of the mold cage halves 52 and 53 respectively.

The links 56, of which there are two on each side of the parison mold cage half 52, support the mold cage half 52 for movement relative to the base 50. Likewise, the links 57, of which there are two on each side of the parison mold cage half 53, support the cage half 53 for movement relative to the base 50. By providing pairs of links 56 and 57 the two mold cage halves 52 and 53, will move toward and away from each other with their complementary faces always parallel to each other.

In order to insure that the two mold cage halves 52 and 53 will have equal opening and closing motions, a pivotal link generally designated 58, in the form of a pair of disk-like elements 59 and 60, is utilized to connect the two mold cage halves together.

As best shown in FIGS. 3, 5, 5A, 5B and 5C, the disk-like elements 59 and 60 are retained within a housing 61 which is connected to the outer bifurcation of the portion 51 of the base 50. The housing 61 is internally recessed and the portion 51 of the base 50 is correspondingly recessed so as to confine the disk-like elements 59 and 60 to rotary motion only. Connected between the disk-like elements are pivot pins 62 and 63. The pivot pin 62 also extends through one end of a connecting link 64 which has its other end pivotally connected to a pin 65 which connects this end of the links 64 to one of the connecting links 57. The pivot pin 63 also extends through one end of a connecting link 66 which has its other end pivotally connected to one of the connecting links 56 by means of a pivot pin 67.

In order to insure the proper clearance between the links 56 and 66 and the links 57 and 64, horizontally extending bosses 68 (FIGS. 5A and 5B) are provided on the outer surface of each of the outermost links 56 and 57 in supporting relationship with respect to the pivot pins 65 and 67 extending therethrough.

Thus it can be seen that upon movement of one mold cage half in the opening direction, for example mold cage half 53, the connecting link 64 will rotate the disk-like elements 59 and 60 of the pivotal link 58. Rotation of the pivotal link 58 will transmit the opening force through the link 66 to the other mold cage half 52. It should be pointed out at this time that the above described linkage 58 is present on both sides of the mold cage halves 52 and 53. Thus, through pivotal interconnection of the two mold cage halves, movement of one mold cage half will be reflected by equal and opposite movement of the other mold cage half.

As best seen in FIG. 6, mold cage half 52 surrounds and supports two parison mold halves 69 in side-by-side relationship. The mold cage half 53 also has positioned therein two parison mold halves 70 which in cooperation with the mold halves 69 form parison mold cavities 71 when in closed position.

The parison mold halves 69 and 70 are supported within the mold cage halves by reason of the fact that they have enlarged annular upper ends which overlie and rest on the upper surface of the parison mold cage halves. In addition to this supporting arrangement, there are provided retaining plates 72 which are fastened to the adjacent faces of the parison mold cage halves, and extend into cut out slots 73 provided in the abutting faces of the parison mold halves 69 and 70. These retaining plates 72 merely provide a loose connection between the mold cage halves and the mold halves. Also they prevent the mold halves from falling out of the cage halves when they are opened. However, they do not prevent the parison mold halves from moving horizontally within the mold cage halves to a limited degree.

As can best be seen in FIG. 6, a plurality of force applying means in the form of pressure pins 74 extend through the walls of the mold cage halves and at their inner ends abut the outer surfaces of the mold halves 69 and 70. These pressure pins 74 are free to slide through the openings in the mold cage halves and serve to applying the closing forces to the parison mold halves. While FIG. 6 shows four pressure pins 74, it should be pointed out that there are actually eight of these pins with two abutting the outer surfaces of each parison mold half, one above the other.

The parison mold cage half 52 is formed with a member 75 defining two cylindrical openings which extend horizontally outward from the center of the mold cage half. These horizontal openings in the member 75 are spaced one above the other and provide cylindrical walls which serve as supporting elements for a pair of hydraulic motors 76. The hydraulic motors 76 are composed of a pair of closed cylinders 77 within which pistons 78 are adapted to reciprocate. Connected to the center of each piston is a piston rod 79 which extends through horizontal openings 80 in the mold cage halves 52 and 53. The outer ends 81 of the piston rods 79 are in the form of an "eye." Each end 81 of the piston rods 79 has a vertical pivot pin 82 extending therethrough to which an equalizer bar 83 is pivotally attached at its center. The equalizer bars 83 are horizontally disposed members having their outer ends in abutting relationship with the outer ends of the pressure pins 74. Thus it can be seen that upon application of fluid under pressure to the motors 76 in such a fashion as to provide a pulling force on the piston rods 79 the two pressure pins 74 associated with each equalizer bar 83 will apply equal clamping force to both of the mold cage halves 70 which are retained in the mold cage half 53.

The other pressure pins 74 which lie in the same horizontal plane as those mentioned above, also abut at their outer ends in force applying relationship with respect to a second pair of horizontal equalizer bars 84 which are provided with trunion pivot connections with the cylinders 77 of the hydraulic motors 76. The cylinders 77 are free to move axially with respect to the cylindrical internal walls of the members 75 within which they are mounted.

With particular reference to FIG. 8, the pivotal connection between one of the equalizer bars 84 and one of the hydraulic cylinders 77, is shown as provided by a pair of bearing members 85 which are seated with diametrically opposed openings in the cylinder 77. The two bearings 85 allow the equalizer bar 84 to pivot about a vertical axis midway between the ends of the equalizer bar 84. The center of the equalizer bar 84 is provided with an opening 86 therethrough through which the piston rod 79 is adapted to extend. Sufficient clearance is provided so that the equalizer bar may oscillate about the vertical axis witout binding on the piston rod 79. Thus it can be seen that upon actuation of the motor 76 to the position shown in FIG. 6, by the introduction of fluid under pressure through a conduit 87, the equalizer bars 83 and 84 will clamp the mold halves 69 and 70 together with equal closing force. By reason of the fact that the pressure pins 74, the piston motor cylinders 77, and the equalizer bars 83 and 84 are free to move in a horizontal direction to a limited extent, the parison molds may close about neck molds which are slightly off-center with respect to the parison molds. This limited horizontal float of the parison mold halves 69 and 70 is advantageous from the standpoint that alignment of the parison mold with the neck rings is assured regardless of what slight misalignment may be present in the neck mold mechanism.

Turning now to the operation of opening the parison molds, it can be seen from viewing FIGS. 4 and 6, that with the conduit 87 connected to exhaust, the introduction of fluid under pressure through a conduit 88 will force the piston rods 79 out of the cylinders 77. Since each piston rod 79 is connected at its outer end to a bar 83 by a pivot pin 82 (see FIG. 9), any movement of the rod 79 will be transmitted to the bar 83. In a like manner each cylinder 77 is free to shift axially to a limited extent within its support 75 and each cylinder is connected to a cross bar 84 (see FIG. 8) by pivot pins 85. Thus it can readily be seen that upon introduction of fluid under pressure to motor 76, through conduit 88, the piston 78 will move toward the top of the sheet, as viewed in FIG. 6, while at the same time the cylinder 77 will move toward the bottom of the sheet, as viewed in FIG. 6. The opposing movements of the cylinders and pistons will obviously result in the equalizer bars 83 and 84 moving away from each other. As previously explained, the bars 83 and 84 may move freely only a short distance until they contact the stop members 89 (see FIGS. 4, 7 and 9). The outward movement of the bars 83 and 84 are limited by the clearance between the bars 83 and 84 and stop members 89 of which there are two that overlie the ends of each equalizer bar 83 and 84. The stop members 89 are fastened to the outer surfaces of the parison mold cage halves 52 and 53 and during the opening movement of the equalizer bars 83 and 84 the opening force is applied by the equalizer bars to these stop members 89. As previously stated, the parison mold cage halves 52 and 53 are mounted for movement away from each other and the previously described pivot link 58 assures that the two parison mold cage halves 52 and 53 will move apart equally.

While it might appear that the piston rods 79 apply all of the opening force, it should be remembered that the cylinders 77 are also horizontally slidable and upon the introduction of fluid under pressure to the motors 76, there will be a reaction to this pressure which will not only move the pistons 78 and rod 79, but also tend to move the cylinder 77. Thus, the opening force will be fairly evenly distributed between all the equalizer bars 83 and 84. While the detailed showing of FIG. 6 may give the impression that there is a single motor 76 which functions to serve as the power source for opening and closing the parison mold halves, it should be pointed out and is obvious from viewing FIGS. 2 and 4, that there are two motors 76 and that each motor operates in the same manner and has the same mechanical linkage connecting the motors to the parison mold halves 69 and 70 and the mold cage halves 52 and 53. By providing two motors, one above the other, it is possible to insure that both the top and bottom of the parison mold halves will remain closed and locked together during pressing of the mold charges.

Another aspect of this invention involves the particular manner of providing cooling air to the external surfaces of the parison mold halves 69 and 70. With particular reference to FIGS. 6 and 7, the parison mold cage halves 52 and 53 are shown provided with internal chambers 90 which serve as passages for conducting cooling air to the mold halves. The chambers 90 surround the parison mold halves and communicate with the outer surface of the parison mold halves 69 and 70 through openings provided in the inside wall of the mold cage halves 52 and 53. These openings 91 are selected according to size, number and spacing so as to provide a pattern of cooling best suited for the cooling of the particular parison being formed.

Cooling air is supplied to the chambers 90 through the base 50. As best seen in FIGS. 6 and 7 the base 50 has a pair of hollow portions 92 with elongated slots 93 in the upper surface thereof adjacent the four corners of the base 50. Each elongated slot 93 is provided with a cover member 94 which is adapted to slide in a slot 95 provided in the upper surface of the mold cage support base 50. The cover members 94 move with the opening and closing movement of the mold cage halves.

The cover members 94 have a circular opening 96 at the center thereof through which a tubular sleeve member 97 is adapted to extend. The tubular sleeve members 97 are fixed with respect to the parison mold cage halves 52 and 53 and serve as the connecting means for conveying the air from the base 50 to the chambers 90 within the parison mold cage halves. As best shown in FIG. 7 in full lines, tubular sleeve member 97 will conduct the coolant to the chamber 90 when the parison mold cage halves are closed. In phantom line, there is shown the relationship of the base and the parison mold cage half 53 when the cage half 53 is opened. It will be noted that there is a slight vertical displacement of the cage half 53 with respect to the base 50 and this vertical motion is accommodated for by the fact that the tubular sleeve member 97 is free to telescope within the opening 96 in cover member 94, thus still retaining its communication of the cooling air to the chamber 90 and will permit cooling of the parison mold halves 69 and 70 at all times.

Referring now to FIG. 10, there is shown a schematic hydraulic diagram illustrating the operational control circuit for raising and lowering the blank molds and for opening and closing the blank molds.

A valve block 110 contains two axially shiftable valve members 111 and 112, and a second valve block 113 contains an axially shiftable valve member 114. Operating fluid for shifting the valve members in a preselected time sequence is supplied from the main valve block through conduits 115 and 116 alternatively. The operating fluid for raising the blank cage assembly is supplied through a conduit 117 and the operating fluid for opening and closing the mold cage is supplied through a conduit 118. Both conduits 117 and 118 are connected to a suitable source of hydraulic fluid under pressure. The position of valve 111 controls the supply of fluid from the conduit 117 to the two conduits 28 and 29 which in turn are connected to opposite ends of the raising and lowering cylinder 27. The position of valve 112 controls the application of hydraulic fluid to the motors 76 by controlling the connection between conduit 118 and the two conduits 87 and 88 connected to opposite ends of the motors 76. It should be understood that the conduits 87 and 88 are each connected to both motors 76 for effecting opening and closing movement of the blank mold cage halves.

The valve 114 has as its primary function the control of the sequence of application of the two working fluids which effect the blank station operations, namely, opening and closing the molds, and raising and lowering the molds. The valve, in effect, is a delay means for allowing one of the above operations to be initiated before the other operation becomes effective.

The following is a description of the operation of raising the blank molds and closing the blank molds. The main valve block which is under control of the machine timer feeds oil under pressure through conduit 116 which is connected to the valve block 110 at one end of valve 111 by means of a branch conduit 119. Shifting of the valve 111 to the right, as shown in FIG. 10, will feed fluid under pressure from the conduit 117 to the conduit 29 resulting in the raising of the blank mold assembly. Conduit 116 is also connected to one end of a piston chamber 120 formed within valve block 113 through a check valve 121 and a throttle valve 122 connected in parallel.

The introduction of fluid under pressure to the piston chamber 120 of the valve block 113 will cause the shifting of the valve 114 to the left to the position shown in FIG. 10. The rate at which the valve 114 is shifted is controlled by a setting of a throttle valve 123 connected to the exhaust side of the piston chamber 120. When the valve 114 has been shifted to the left, fluid in conduit 116 may reach chamber 124 in valve block 110 at the left end of valve member 112. As can be seen, oil will flow through the line 116 to a branch line 125 connected to the valve block 113 and will pass a relieved portion 126 of valve 114 and flow into the conduit 127. The conduit 127 is connected to chamber 124, resulting in a shifting of the valve 112 to the right to the position shown.

With valve 112 positioned to the right as shown in FIG. 10, fluid under pressure in line 118 will flow past reduced portion 128 of valve 112 into the line 87 resulting in a closing of the blank mold cage. The blank mold cage, when raised and closed, is ready to receive mold charges.

When the mold charges have been pressed and the period of dwell completed, the main valve block will shift the application of fluid under pressure from the conduit 116 to conduit 115 and exhaust the conduit 116. Application of fluid under pressure through the conduit 115 will immediately cause shifting of the valve member 112 to the left by the introduction of fluid under pressure to chamber 129 in valve block 110 at the right end of valve member 112. Fluid under pressure from the line 115 is also introduced to the left end of the chamber 120 resulting in a shifting of the valve 114 to the right. The rate of movement of the valve 114 is controlled by the setting of a throttle valve 122 which now is in the exhaust side of the system and is connected across a check valve 121 in the conduit 116. Shifting of the valve 112 to the left allows the introduction of fluid under pressure from the conduit 118 to conduit 88 and motors 76 to affect the opening of the blank mold cages 52 and 53.

Furthermore, the relieved portion 128 of the valve 112 will connect the conduit 87 to an exhaust port 130 in valve block 110. This exhaust port 130 is connected to a sump or other suitable collecting means through a throttle valve 131. Adjustment of the throttle valve 131 will control the rate of exhaust of fluid from the motors 76 and serves as a means for controlling the rate of opening of the blank cage. A similar throttle valve 132 provides a rate control for the exhaust of fluid from motors 76 when operating in the opposite direction when the conduit 88 is connected to a sump through the valve 132.

After the valve 114 has been shifted to the right, a relieved portion 133 thereof will allow communication between the pressure fluid in conduit 115 and the chamber 134 in valve block 110 at the right end of valve 111. As can be seen, fluid will pass from chamber 140 to chamber 141 in valve block 113 and thence through conduit 142 to chamber 134 in the valve block 110. The introduction of pressure fluid to chamber 134 will result in a shifting of the valve 111 to the left. Shifting of the valve 111 to the left will connect the motor 27 and conduit 29 thereof to a throttle valve 135 in the line leading to a sump or suitable collecting means.

Furthermore fluid under pressure in the conduit 117 will be in communication with the conduit 28 resulting in lowering the blank mold cage. A throttle valve 136 is provided in the exhaust line from conduit 28 and motor 27, and may be adjusted to control the rate of elevating the blank mold cage. In the same manner the valve 135 may be adjusted to regulate the rate of lowering the mold cage.

Thus it can be seen that the valve 114 is, in a sense, a delay valve which allows the parison mold halves 69 and 70 to be opened before the mechanism for lowering the mold cage is activated. In the same manner, valve 114 provides the necessary delay for allowing the mold cage raising mechanism to position the open parison mold cage halves in their completely raised position before the motors 76 are actuated to close the parison mold halves about the neck rings. It should be pointed out that the neck rings have cooperating flange structure (not shown) which is adapted to be received within the inner annular grooves 137 shown in dotted lines on FIGS. 2 and 4. These grooves 137 are, as shown, provided with downwardly and outwardly tapering upper surfaces so that upon closing the parison mold halves about the neck ring, the mold halves may be slightly raised and clamped against the bottom surface of the neck molds. Thus it can be seen that upon closing of the parison molds about the neck molds, there will be a positive locking of the parison mold halves with respect to the neck molds so as to form a continuous parison forming cavity.

In summary it can be seen that the above described apparatus provides a compact arrangement for forming narrow neck parisons in an upright position within the two-piece parison mold. Charging of the parison mold is accomplished by feeding gobs through the neck rings into the closed parison molds. The pressing of the parisons is accomplished by movement of the plungers vertically downward into the parison mold cavities through the neck rings. The advantage of a two-piece parison mold for narrow neck ware forming is the elimination of baffle marks which are present when parison molds are loaded and pressed in an inverted position.

It is also apparent from the above description that the parison forming molds are capable of high speed operation and by reason of the limited amount of floating of the parison mold halves 69 and 70 within the mold cage halves 52 and 53, the problem of proper alignment between the mold cavities and the neck ring cavities is eliminated.

It will, of course, be understood that various details of construction of the device may be modified to a wide range without departing from the principle of this invention and it is therefore not the purpose to limit the patent granted hereon otherwise than necessitated by the scope of the appended claims.

I claim:
1. An apparatus for simultaneously forming a pair of narrow neck parisons in an upright position, comprising a hydraulic motor having a piston and cylinder, two pairs of complementary parison mold halves, means for supporting said mold halves in such a manner that they are loosely retained in side-by-side relationship, a base, vertically extending parallel linkage connected between said supporting means and said base, said support means being operable for effecting opening and closing movement of said mold halves, means interconnecting the support means for each pair of mold halves for limiting the opening and closing movements of said support means to equal and opposite movements, means for mounting said cylinder on said support means for relative horizontal motion, means extending through said supports for applying closing forces individually to said mold halves, an equalizer bar connected to the force applying means for two of the side-by-side mold halves, means pivotally connecting said bar at its center to said piston, a second equalizer bar connected to the force applying means for the other two side-by-side mold halves, means pivotally connecting said second bar at its center to said cylinder and means for operating said motor to effect closing of said two molds whereby equal closing force will be applied to both molds and the molds are independently shiftable in a horizontal plane with respect to said support means.

2. The apparatus of claim 1 wherein said support means are provided with internal chambers surrounding said molds, a base, means connecting said support means to said base for relative movement with respect thereto, means for supplying air to said base, and means connecting said base to said support means for directing said air from said base to said chambers when said mold halves are in both open and closed position.

3. The apparatus of claim 2 wherein said air connecting means comprises a flat plate receivable in an elongated groove on the upper surface of said base and a tubular sleeve telescopically slidable in and extending through an opening in said plate, said sleeve being connected to the support means and being in communication with the chamber therein.

4. An apparatus for simultaneously forming a pair of narrow neck parisons in an upright position, comprising a base member, a first mold cage half, a second mold cage half, vertically extending parallel linkage connecting said cages to said base for mounting said mold cage halves on said base for relative opening and closing movement, means connected between said cages for limiting said cage halves to equal opening and closing movements, a fluid motor having a piston, piston rod and a cylinder, means for mounting said cylinder on said first mold cage half for limited relative horizontal motion, two pairs of complementary parison mold halves, means for loosely retaining two of said parison mold halves in side-by-side relationship with respect to said first mold cage half, means for loosely retaining the complementary parison mold halves in side-by-side relationship with respect to said second mold cage half, said mold cage halves having a pair of spaced apart openings formed in the wall thereof with the openings in one cage half being in diametrically opposed relationship with respect to the openings in the other cage half, horizontally shiftable members extending through the openings in said mold cage halves and having one end in abutting relationship with respect to each parison mold half, a first equalizer bar in abutting relationship with the other end of said horizontally shiftable members of two side-by-side mold halves, means pivotally connecting said bar at its center to said piston rod, a second equalizer bar in abutting relationship with the hoizontally shiftable members of the other two-side-by-side mold halves, means pivotally connecting the center of said second bar to said cylinder and means for operating said motor to effect closing of said two molds whereby equal closing force will be applied to all the mold halves and the mold halves are horizontally shiftable relative to said mold cage halves.

5. The apparatus as defined in claim 4 wherein said mold cage halves are provided with internal chambers surrounding said molds, means for supplying air to said base, means connecting the interior of said base to the chambers in said mold halves for directing said air from said base to said chambers when said mold halves are in both open and closed position.

6. The apparatus as defined in claim 5 wherein said connecting means comprises a plurality of flat plates slidably received in elongated grooves formed in the upper surface of said base and overlying elongated openings in said base, a plurality of tubular sleeves connected to the mold cage, each sleeve being telescopically received in an opening in each plate, and communicating with the air supply in said base.

7. In apparatus for forming a pair of narrow neck parisons wherein split molds are loosely retained in mold supporting members which are adapted to be moved toward and away from each other to effect opening and closing of said split molds, the improvement comprising, a reciprocating piston type fluid motor for effecting the opening and closing of said mold supporting members, means integral with one of said mold supporting members for supporting the cylinder of said motor with its axis horizontal, a piston rod of said motor extending between the pair of split molds, a first force transmitting equalizer bar pivotally connected at its center to the end of said piston rod with its ends in alignment with the mold halves carried by the other mold support, a second force transmitting equalizer bar pivotally connected at its center to the cylinder of said motor in parallel relationship with respect to said first bar, pressure pins extending from the ends of said bars into abutting relationship with the backs of said mold halves for equalizing the closing forces applied to said split molds, stop members connected to said mold supports and overlying the ends of said bars, whereby operation of said motor to force the rod outwardly thereof will open said mold supports and the split molds, and means interconnecting said mold supports for confining said mold supports to equal movements toward and away from the vertical plane defined by the split line of said split molds.

8. The apparatus as defined in claim 7 wherein, said piston rod extends through an opening in said one mold support and an aligned opening in said other mold support to a point beyond the outside of said other support.

9. The apparatus as defined in claim 7 wherein, said means interconnecting said mold supports comprises a relatively fixed base member, a pair of disks pivotally mounted to said base with its pivot axis coincident with said vertical plane and parallel links connected to said disks at diametrically opposed points thereof and having their ends pivotally connected to the respective mold support members.

10. The apparatus as defined in claim 7 wherein said support member halves are provided with internal chambers surrounding said split molds, means for supplying air under pressure to said chambers, and means in the interior wall of said chambers for directing said air from said chambers onto the external surface of said mold halves when in both open and closed position.

References Cited by the Examiner
UNITED STATES PATENTS

| | | | |
|---|---|---|---|
| 1,737,524 | 5/29 | Soubier | 65—224 |
| 2,357,501 | 9/44 | Carnahan | 65—238 |
| 2,757,485 | 8/56 | Fedevich | 65—167 |
| 2,834,155 | 5/58 | Allen | 65—360 |
| 2,949,701 | 8/60 | Olson et al. | 65—361 |
| 3,021,644 | 2/62 | Lauck | 65—360 |

FOREIGN PATENTS

| | | |
|---|---|---|
| 426,311 | 4/35 | Great Britain. |
| 730,728 | 5/55 | Great Britain. |

DONALL H. SYLVESTER, *Primary Examiner.*

ARTHUR P. KENT, *Examiner.*